(12) United States Patent
Minagawa et al.

(10) Patent No.: US 6,732,526 B2
(45) Date of Patent: May 11, 2004

(54) HYBRID AUTOMATIC TRANSMISSION

(75) Inventors: Yuusuke Minagawa, Kanagawa (JP); Toshikazu Oshidari, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/375,026

(22) Filed: Feb. 28, 2003

(65) Prior Publication Data

US 2003/0181276 A1 Sep. 25, 2003

(30) Foreign Application Priority Data

Mar. 25, 2002 (JP) ........................................ 2002-083090

(51) Int. Cl.$^7$ ............................ F16H 3/72; F16H 37/06; B60K 4/02; B60K 17/06; B60L 11/00; H02H 3/72

(52) U.S. Cl. ............................ 60/706; 60/711; 60/716; 180/65.2; 180/65.4; 180/65.6; 475/5; 477/76; 477/98

(58) Field of Search ..................... 60/706, 711, 716; 180/65.2, 65.3, 65.4, 65.6; 475/5; 477/76, 97, 98

(56) References Cited

U.S. PATENT DOCUMENTS

| 6,383,114 | B1 | 5/2002 | Hoshiya et al. |
| 6,622,805 | B2 * | 9/2003 | Nakashima ............... 180/65.2 |
| 2003/0176955 | A1 * | 9/2003 | Minagawa et al. ....... 180/65.3 |

FOREIGN PATENT DOCUMENTS

| JP | 2000-142146 A | 5/2000 |
| JP | 2000-238555 A | 9/2000 |

OTHER PUBLICATIONS

U.S. patent application Ser. No. 10/375,347, Minagawa et al., filed Feb. 28, 2003

J.S. Souder, "Powertrain Modeling and Nonlinear Fuel Control", Masters of Science in Mechanical Engineering, Controls, University of California, Berkeley, 2002, pp. 13–38.

* cited by examiner

Primary Examiner—Sheldon J. Richter
(74) Attorney, Agent, or Firm—Foley & Lardner

(57) ABSTRACT

In a hybrid automatic transmission of a hybrid electric vehicle equipped with a differential device having two-degree-of-freedom and at least four rotating members respectively connected to a prime mover as an input element, a drive train as an output element, and first and second motor-generators. A specified relationship among inertias of rotating systems relating to the prime mover, output element, and first and second motor-generators, a first lever ratio of a distance between an input element and the first motor-generator to a distance between the input and output elements, and a second lever ratio of a distance between the output element and the second motor-generator to the distance between the input and output elements is determined, so that a center of gravity of a lever on an alignment chart of the hybrid transmission is laid out on the output element or between the output element and the second motor-generator.

8 Claims, 7 Drawing Sheets

DURING STEADY-STATE EV DRIVING MODE (Ne, Te = 0)

DURING ENGINE START-UP (Ne > 0, Te > 0)

HYBRID AUTOMATIC TRANSMISSION

TECHNICAL FIELD

The present invention relates to a hybrid automatic transmission suitable for a hybrid electric vehicle (HEV) mounting thereon a prime mover such as an internal combustion engine and at least one motor-generator, and specifically to the improvement of a hybrid automatic transmission having a differential device disposed between the prime mover and the motor-generator to steplessly vary a transmission gear ratio.

BACKGROUND ART

In recent years, there have been proposed and developed various hybrid electric vehicles equipped with hybrid automatic transmissions. One such hybrid automatic transmission has been disclosed in Japanese Patent Provisional Publication No. 2000-238555 (hereinafter is referred to as "JP2000-238555"). FIG. 9 shows a schematic structural drawing of the hybrid automatic transmission as disclosed in JP2000-238555. The hybrid transmission shown in FIG. 9 uses a simple planetary gearset 31 that is comprised of a sun gear 31s, a ring gear 31r, and a planet-pinion carrier 31c. Input torque from an internal combustion engine is transmitted via a transmission input shaft 32 to carrier 31c. On the one hand, a part of the input torque transmitted to carrier 31c is transmitted through sun gear 31s and a cylindrical hollow shaft (or a sun-gear shaft) 33 to a first motor-generator 34 serving as a generator. On the other hand, the remaining engine torque is transmitted through ring gear 31r, a sprocket 35, a chain belt 36, and a differential gear 39 to drive wheels 37, 37. The ring-gear shaft of ring gear 31r is connected to the rotor of a second motor-generator 38 serving as an electric motor.

SUMMARY OF THE INVENTION

Referring now to FIGS. 10 and 11, there are shown alignment charts representing the construction of the simple-planetary-gearset equipped hybrid automatic transmission system shown in FIG. 9. Simple planetary gearset 31 is a differential device having a three-element, two-degree-of-freedom. Thus, second motor-generator 38 (serving as the motor) is connected directly to ring gear 31r serving as an output element to which a drive train containing differential gear device 39 is connected. As can be seen from the alignment chart of FIG. 10, first motor-generator 34 (serving as the generator) is connected to sun gear 31s that is placed in the opposite side of the output element (ring gear 31r) with respect to carrier 31c serving as an input element to which the engine is connected. The alignment chart of FIG. 10 is obtained under a specific condition (in a motor propelled vehicle driving mode) where an engine speed Ne is "0", an engine load torque Te is "0", and the vehicle is propelled against a wheel load torque T0 acting on road wheels by driving second motor-generator 38 (serving as the motor operating in the motor propelled vehicle driving mode) to produce a balanced motor-generator torque Tmg20 at a forward motor-generator rotational speed Nmg20. Under the motor propelled vehicle driving mode, first motor-generator 34 (serving as the generator) is driven by a balanced torque Tmg10 acting in a direction that a reverse motor-generator rotational speed Nmg10 of first motor-generator 34 drops to "0", so as to generate electricity. The generated electricity is supplied as a part of electric power used to drive second motor-generator 38 (the motor). The alignment chart of FIG. 11 shows a transition from the motor propelled vehicle driving mode to an engine start-up mode. The collinear indicated by the broken line in FIG. 11 corresponds to a lever on the alignment chart of the motor propelled vehicle driving mode shown in FIG. 10. On the other hand, the collinear indicated by the solid line in FIG. 11 corresponds to a lever on the alignment chart of the engine start-up mode in which, in order to increase engine speed Ne against the engine load torque Te, the reverse motor-generator rotational speed of first motor-generator 34 is reduced from the speed value Nmg10 to a speed value Nmg11 close to "0" by way of a balanced torque Tmg11 acting on the first motor-generator. At this time, there are the following drawbacks.

Regarding the alignment chart of FIG. 11, the input rotation system connected to carrier 31c includes the engine whose inertia is great. Likewise, the input rotation system connected to ring gear 31r includes the differential gear device and drive wheels and thus the input rotation system has a great inertia. The center-of-gravity G of the lever on the alignment chart indicated by the broken line in FIG. 11 is positioned between carrier 31c (or the engine) having the great inertia and ring gear 31r (or the output element) having the great inertia. For the reasons set forth above, when reducing the reverse motor-generator rotational speed of first motor-generator 34 from speed value Nmg10 to speed value Nmg11 for an engine start-up from the motor propelled vehicle driving mode, the lever on the alignment chart indicated by the broken line in FIG. 11 is rotated about the center of gravity G and changed to the lever on the alignment chart indicated by the solid line in FIG. 11. This means that a reaction force resulting from the great inertia of the input rotation system (the engine) acts to unintentionally reduce the rotational speed of the output rotation system containing the differential gear device and drive wheels, thus resulting in a temporary drop in vehicle speed. At this time, the driver may feel uncomfortable. To avoid this, a balanced motor-generator torque Tmg21 of second motor-generator 38 has to be controlled or adjusted to a greater value than the balanced motor-generator torque Tmg20 of the motor propelled vehicle driving mode shown in FIG. 10 by an incremental torque needed to prevent the undesired vehicle speed drop, when starting up the engine from the motor propelled vehicle driving mode under the same wheel load torque T0. In this case, during the motor propelled vehicle driving mode, second motor-generator 38 has to be driven by the remaining electric power obtained by subtracting an electric power corresponding to the previously-noted incremental torque from a possible battery output power to enable engine start-up. The remaining electric power means a reduced vehicle driving performance during the motor propelled vehicle driving mode. To insure the vehicle driving performance greater than a predetermined level, a large capacity of car battery must be used. In addition to the above, owing to the layout of center of gravity G put between carrier 31c (or the engine) and ring gear 31r (or the output element), there is an increased tendency for engine torque fluctuations, which may occur during the engine start-up period, to be transmitted to the output element, thus resulting in the driver's uncomfortable feeling. To eliminate the driver's uncomfortable feeling, for instance, it is necessary to instantaneously control a generated torque of second motor-generator 38 directly connected to the output element responsively to positive and negative engine torque fluctuations. Actually, it is very difficult to momentarily adjust or control the generated torque of second motor-generator 38, and therefore it is almost impossible to perfectly eliminate engine torque fluctuations. Such undesired torque fluctuations lead to the problem of deteriorated vehicle's driveability.

Accordingly, it is an object of the invention to provide a hybrid automatic transmission of a hybrid electric vehicle, which avoids the aforementioned disadvantages by improving a position of a center of gravity of a lever on an alignment chart of the hybrid automatic transmission.

In order to accomplish the aforementioned and other objects of the present invention, a hybrid automatic transmission of a hybrid electric vehicle mounting thereon a prime mover, first and second motor-generators and a drive train, and capable of steplessly varying a transmission gear ratio by controlling an operating state of each of the first and second motor-generators, comprises a differential device having at least four rotating members and two degrees of freedom that determining rotating states of two members of the four rotating members enables rotating states of the other rotating members to be determined, a first member of the four rotating members serving as an input element connected to the prime mover, a second member serving as an output element connected to the drive train, a third member connected to the first motor-generator, and a fourth member connected to the second motor-generator, and a specified relationship among an inertia of a rotating system relating to the prime mover, an inertia of a rotating system relating to the output element, an inertia of a rotating system relating to the first motor-generator, an inertia of a rotating system relating to the second motor-generator, a first lever ratio of a distance between the input element and the first motor-generator to a distance between the input and output elements, and a second lever ratio of a distance between the output element and the second motor-generator to the distance between the input and output elements is determined so that a center of gravity of a lever on an alignment chart of the hybrid automatic transmission is laid out on the output element or between the output element and the second motor-generator.

The other objects and features of this invention will become understood from the following description with reference to the accompanying drawings.

DESCRIPTION OF THE PREFERRED EMBODIMENTS

Figure 1:
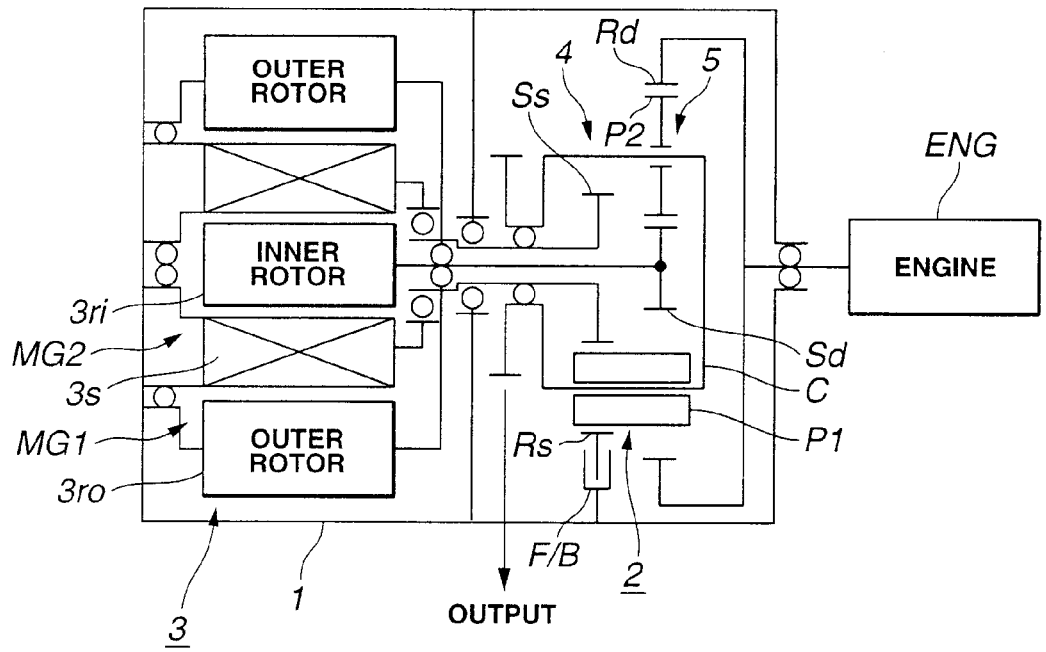
FIG. 1 is a schematic block diagram illustrating one embodiment of a hybrid automatic transmission of a hybrid electric vehicle made according to the invention.

Referring now to the drawings, particularly to FIG. 1, the hybrid automatic transmission of the embodiment is exemplified in a transaxle of a front-wheel-drive vehicle. The hybrid transmission of the embodiment is mainly comprised of a Ravigneaux type planetary gearset 2 and a motor-generator set (MG1, MG2). Ravigneaux type planetary gearset 2 is built in a right-hand half (viewing FIG. 1) of a transmission case land located near an internal combustion engine ENG. Motor-generator set (MG1, MG2), which is composed of a compound multiphase alternating current motor 3, is built in transmission case 1 in the opposite side (in the left-hand half) of Ravigneaux type planetary gearset 2. In the shown embodiment, a compound multiphase alternating current (AC), multi-layer (double-layer) motor, which has multiple rotors (two rotors in the shown embodiment) and is driven by compound multiphase AC, is used as the motor-generator set. The inner and outer rotors of the motor-generator set (MG1, MG2) are driven independently of each other by the compound multiphase AC that is obtained by compounding a control current applied to one of the motor-generator set and a control current applied to the other. Ravigneaux type planetary gearset 2 and compound multiphase AC double-layer motor 3 are coaxially arranged with respect to the axis of transmission case 1. Ravigneaux type planetary gearset 2 is comprised of a compound planetary gear train that a single-pinion type planetary gearset 4 is combined with a double-pinion type planetary gearset 5, and a pinion (a common pinion) P1 and a ring gear (a common ring gear) Rs are common to the two planetary gearsets 4 and 5. As seen in FIG. 1, single-pinion planetary gearset 4 is located near compound multiphase AC double-layer motor 3, whereas double-pinion planetary gearset 5 is located closer to engine ENG. Single-pinion planetary gearset 4 is comprised of a sun gear Ss, common ring gear Rs, and common pinion P1 in meshed-engagement with both the sun gear Ss and common ring gear Rs. On the other hand, double-pinion planetary gearset 5 is comprised of a sun gear Sd, common pinion P1, common ring gear Rs, a ring gear Rd, and a large-diameter pinion P2. Large-diameter pinion P2 is in meshed-engagement with all of the three gears, namely sun gear Sd, ring gear Rd, and common pinion P1. Pinions P1 and P2 of the two planetary gearsets 4 and 5 are rotatably mounted or supported on shafts that are a portion of a common pinion carrier C. As discussed above, five rotating members (five elements), that is, sun gear Ss, sun gear Sd, ring gear Rs, ring gear Rd, and pinion carrier C correspond to main component parts of Ravigneaux type planetary gearset 2. In case of Ravigneaux type planetary gearset 2, determining rotating states (rotational speeds) of two members of the five rotating members enables rotating states (rotational speeds) of the other rotating members to be determined. That is to say, Ravigneaux type planetary gearset 2 is a differential device having a five-element, two-degree-of-freedom. As clearly shown in FIG. 1, in Ravigneaux type planetary gearset 2 incorporated in the hybrid automatic transmission of the embodiment, ring gear Rd of double-pinion type planetary gearset 5 is connected to a coaxially-arranged crankshaft of engine ENG so that input torque (engine torque) is transmitted into ring gear Rd. On the other hand, common pinion carrier C is connected to the road-wheel drive train, which includes a final reduction gear device 6 containing a differential gear interposed between left and right axle driveshafts associated with left and right drive wheels 7, 7, so that output torque from Ravigneaux type planetary gearset 2 is extracted from common pinion carrier C. Compound multiphase AC double-layer motor 3 is comprised of an inner rotor 3ri and an annular outer rotor 3ro surrounding the inner rotor. Inner and outer rotors 3ri and 3ro are coaxially arranged with each other at the rear axial end (the left-hand end) of transmission case 1 and rotatably supported in transmission case 1. A common stator 3s is disposed in an annular space defined between the outer periphery of inner rotor 3ri and the inner periphery of outer rotor 3ro and fixedly connected to transmission case 1. Stator 3s includes an annular stator coil. Annular stator coil 3s and outer rotor 3ro construct an outside motor-generator (a first motor-generator denoted by MG1), while annular stator coil 3s and inner rotor 3ri construct an inside motor-generator (a second motor-generator denoted by MG2). When compound multiphase alternating current is supplied to each of first and second motor-generators MG1 and MG2, each motor-generator MG1, MG2 functions as an electric motor that outputs a motor torque having an rotational direction corresponding to a current direction of the supply current and a rotational speed corresponding to a current strength of the supply current. On the contrary, when there is no compound multiphase alternating current supply to each of first and second motor-generators MG1 and MG2, each motor-generator MG1, MG2 functions as a generator that outputs an electric power corresponding to the magnitude of torque applied by way of an external force. In mechanically linking compound multiphase AC double-layer motor 3 to Ravigneaux type planetary gearset 2, inner rotor 3ri of second motor-generator MG2 (the inside motor-generator) is connected to sun gear Sd of double-pinion type planetary gearset 5, whereas outer rotor 3ro of first motor-generator MG1 (the outside motor-generator) is connected to sun gear Ss of single-pinion type planetary gearset 4. If necessary, a forward brake F/B may be provided to properly brake ring gear Rs of single-pinion type planetary gearset 4. If such a braking operation for ring gear Rs is unnecessary, forward brake F/B can be eliminated.

Figure 4:
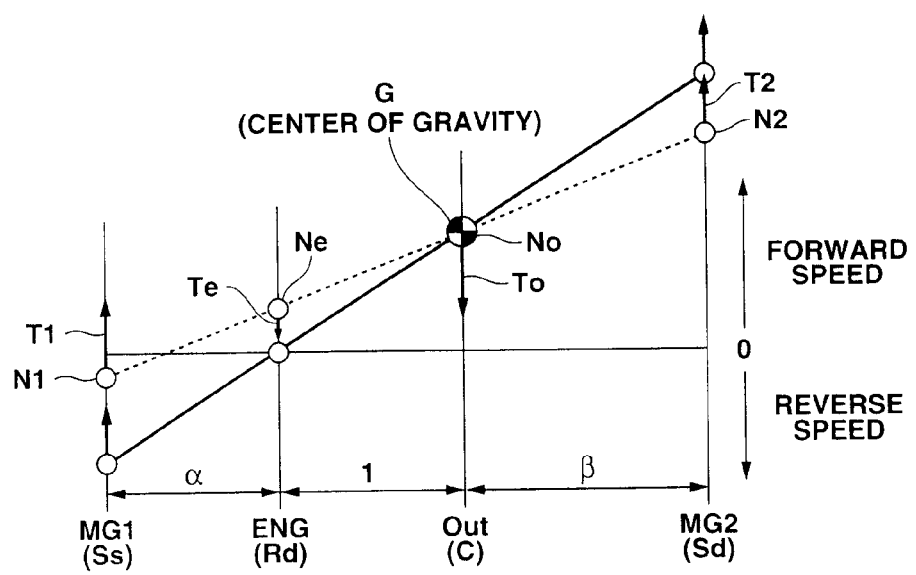
FIG. 4 is an alignment chart of each of the hybrid automatic transmissions shown in FIGS. 1 and 2 without using a forward brake or with the forward brake released, in which a center of gravity of a lever on the alignment chart is positioned on an output element.
Figure 5:
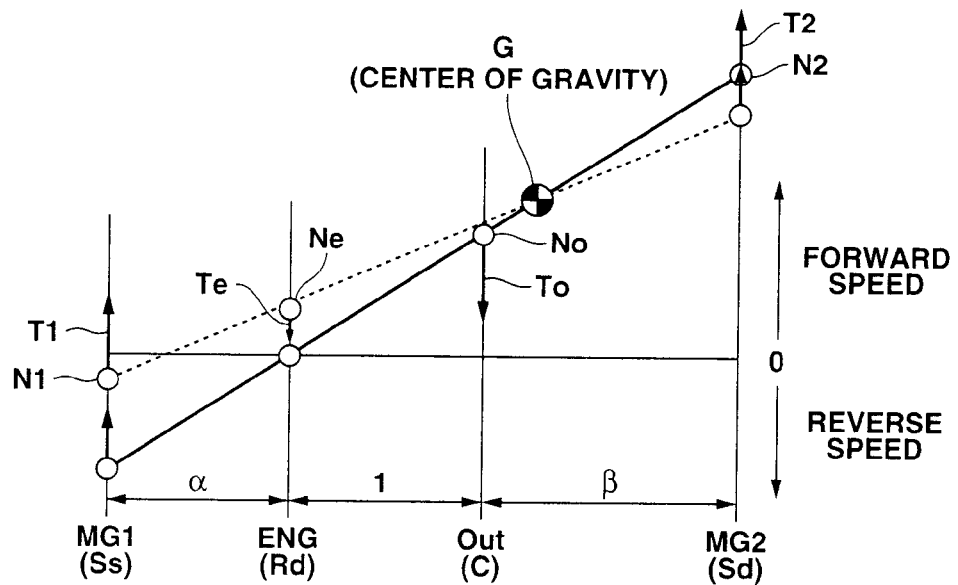
FIG. 5 is an alignment chart of each of the hybrid automatic transmissions shown in FIGS. 1 and 2 without using a forward brake or with the forward brake released, in which a center of gravity of a lever on the alignment chart is positioned between an output element and an output side motor/generator MG2.

Referring now to FIGS. 4 and 5, there are shown alignment charts of each of the hybrid transmission of the embodiment shown in FIG. 1 and the modified hybrid transmission shown in FIG. 2 (described later) without using the forward brake or with the forward brake released. In the charts of FIGS. 4 and 5, a ratio |ENG(Rd)−MG1(Ss)|/|ENG(Rd)−Out(C)| of a distance |ENG(Rd)−MG1(Ss)| between ring gear Rd (engine ENG) and sun gear Ss (first motor-generator MG1) to a distance |ENG(Rd)−Out(C)| between ring gear Rd (engine ENG) and common pinion carrier C (output element Out) represents a lever ratio α on the assumption that the distance |ENG(Rd)−Out(C)| between ring gear Rd (engine ENG) and common pinion carrier C (output element Out) is "1". A ratio |Out(C)−MG2(Sd)|/|ENG(Rd)−Out(C)| of a distance |Out(C)−MG2(Sd)| between common planet carrier C (output element Out) and sun gear Sd (second motor-generator MG2) to a distance |ENG(Rd)−Out(C)| between ring gear Rd (engine ENG) and common pinion carrier C (output element Out) represents a lever ratio β on the assumption that the distance |ENG(Rd)−Out(C)| between ring gear Rd (engine ENG) and common pinion carrier C (output element Out) is "1". The aforesaid lever ratios α and β are determined depending on a gear specification of Ravigneaux type planetary gearset 2. On the other hand, a gradient (corresponding to a transmission gear ratio i) of the lever on each of the alignment charts shown in FIGS. 4 and 5 is determined depending on three factors, namely an engine operating point (Ne, Te) that is a combination of a hybrid transmission input speed (engine speed Ne) and a hybrid transmission input torque (engine torque Te), a first motor-generator operating point (N1, T1) that is a combination of a first motor-generator rotational speed N1 of first motor-generator MG1 associated with and connected to sun gear Ss of single-pinion type planetary gearset 4 and a first motor-generator torque T1, and a second motor-generator operating point (N2, T2) that is a combination of a second motor-generator rotational speed N2 of second motor-generator MG2 associated with and connected to sun gear Sd of double-pinion type planetary gearset 5 and a second motor-generator torque T2. Thus, a combination (No, To) of a hybrid transmission output rotational speed (transmission output speed No) and a hybrid transmission output torque (transmission output torque To) is determined depending on the aforementioned three operating points (Ne, Te), (N1, T1) and (N2, T2). For instance, transmission output torque To is represented by the expression To=−T1−T2−Te, whereas first motor-generator torque T1 is represented by the expression T1=T2+Te.

As described previously, in the hybrid transmission of the embodiment shown in FIG. 1, first and second motor-generators MG1 and MG2 are constructed as the compound multiphase AC double-layer motor and concentrically arranged with each other with respect to the axis of transmission case 1. The layout and construction of first and second motor-generators MG1 and MG2 are not limited to such a compound multiphase AC double-layer motor construction. In lieu thereof, as seen from the modified hybrid transmission shown in FIG. 2, first and second motor-generators MG1 and MG2 may be laid out in such a manner as to be radially offset from each other. In contrast to the modified hybrid transmission of FIG. 1, in the modified hybrid transmission of FIG. 2 second motor-generator MG2 is associated with and connected to sun gear Ss of single-pinion type planetary gearset 4, whereas first motor-generator MG1 is associated with and connected to sun gear Sd of double-pinion type planetary gearset 5. More concretely, second motor-generator MG2 is constructed by a stator coil 3so and a rotor 3ro that is arranged coaxially with respect to Ravigneaux type planetary gearset 2. On the other hand, first motor-generator MG1 is constructed by a stator coil 3si and a rotor 3ri whose axis is offset from the axis of Ravigneaux type planetary gearset 2. A drive shaft (a sun-gear shaft) fixedly connected to sun gear Sd extends axially in a manner so as to penetrate the center of second motor-generator rotor 3ro. The axially-extending sun-gear shaft of sun gear Sd and the rotor shaft of first motor-generator rotor 3*ri* are mechanically linked and having a driving connection or driven connection with each other by means of a gear train 11. The offset layout of first and second motor-generators MG1 and MG2 shown in FIG. 2 is superior to the concentric motor-generator layout shown in FIG. 1, with respect to increased degrees of freedom of the motor-generator layout in a limited space of transmission case 1. As can be seen from comparison between the constructions of the hybrid transmissions of FIGS. 1 and 2, each of the hybrid transmissions of FIGS. 1 and 2 is mainly comprised of Ravigneaux type planetary gearset 2 and motor-generator set MG1, MG2. As discussed above, the basic constructions are the same in both the hybrid transmissions shown in FIGS. 1 and 2, and therefore the alignment charts shown in FIGS. 4 and 5 can be applied to the modified hybrid transmission of FIG. 2 as well as the hybrid transmission of the embodiment of FIG. 1.

Figure 2:
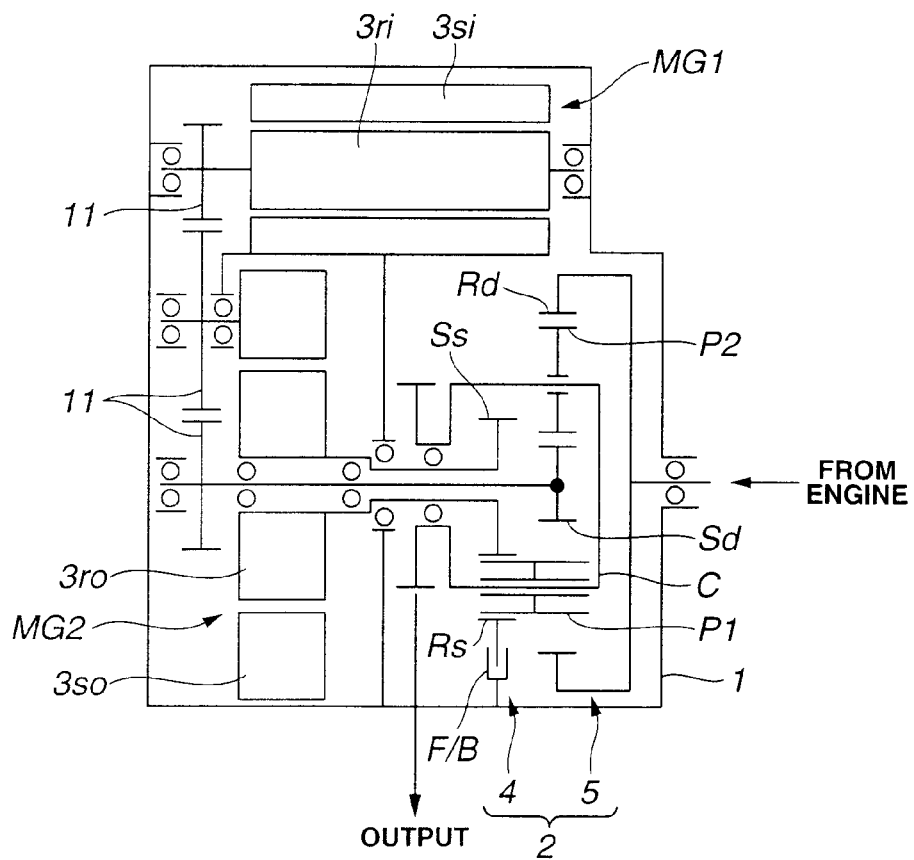
FIG. 2 is a schematic diagram illustrating a modified hybrid automatic transmission made according to the invention.
Figure 3:
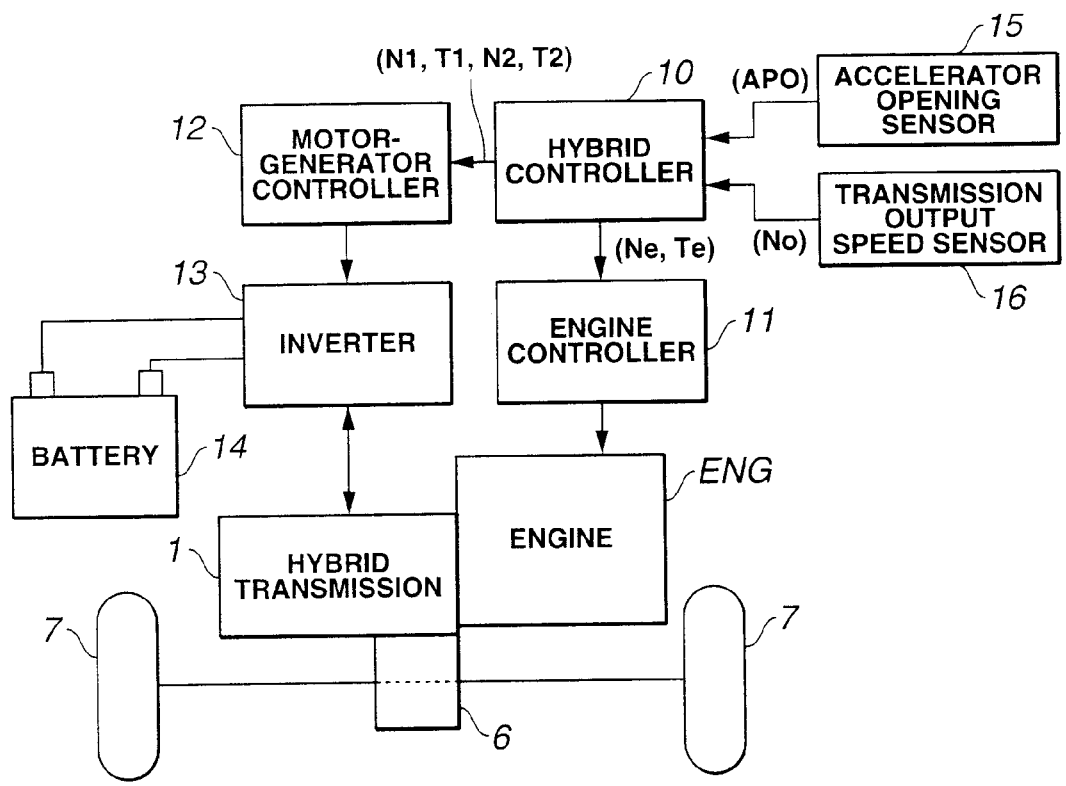
FIG. 3 is a system block diagram illustrating an automatic shift control system of the hybrid automatic transmission of the embodiment.

Referring now to FIG. 3, there is shown the system block diagram of the automatic shift control system of the hybrid transmission shown in FIG. 1 or 2. As clearly shown in FIG. 3, the shift control system includes a hybrid electric vehicle (HEV) controller, simply a hybrid controller 10. Hybrid controller 10 serves to send out a command regarding the engine operating point (Ne, Te) to an engine controller 11, so that engine ENG operates at the engine operating point (Ne, Te). Hybrid controller 10 also serves to send out a command regarding the first and second motor-generator operating points (N1, T1) and (N2, T2) to a motor-generator controller 12, so that first and second motor-generators MG1 and MG2 operate at the respective operating points (N1, T1) and (N2, T2) via an inverter 13 and a car battery 14, both electrically connected to the motor-generator controller. Engine controller 11 and motor-generator controller 12 are electrically connected to hybrid controller 10 to communicate with the hybrid controller through a data link (signal lines). Each of controllers 10 to 12 generally comprises a microcomputer that includes a central processing unit (CPU) or a microprocessor (MPU), memories (RAM, ROM), and an input/output interface (I/O). The input/output interface (I/O) of hybrid controller 10 receives input information from various engine/vehicle sensors containing at least an accelerator position sensor or an accelerator-opening sensor 15, and a transmission output speed sensor 16. Accelerator-opening sensor 15 is provided to detect or monitor an accelerator opening APO (corresponding to the amount of depression of an accelerator pedal). Transmission output speed sensor 16 is provided to detect or monitor a transmission rotational speed No. Within the hybrid controller, the central processing unit (CPU) allows the access by the I/O interface of input informational data signals (APO, No) from engine/vehicle sensors, and is responsible for carrying various control programs stored in the memories and capable of performing necessary arithmetic and logic operations. Computational results or arithmetic calculation results, in other words, command signals are relayed via the output interface circuitry of hybrid controller 10 to the input interfaces of engine controller 11 and motor-generator controller 12. These command signals are used for engine control for engine operating point (Ne, Te), and for motor-generator control for first and second motor-generator operating points (N1, T1) and (N2, T2).

Figure 6:
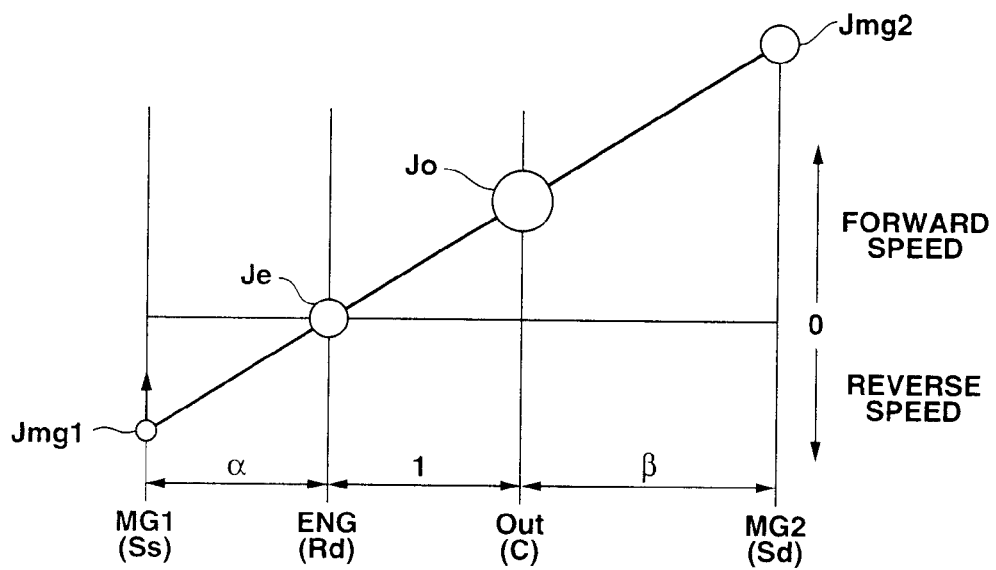
FIG. 6 is an alignment chart of each of the hybrid automatic transmissions shown in FIGS. 1 and 2 without using a forward brake or with the forward brake released, in which inertias Jmg1, Je, Jo, and Jmg2 of input/output rotation systems associated with the lever on the alignment chart are simultaneously shown on the alignment chart.

Regarding the hybrid transmission of the embodiment, constructing a portion of the automatic shift control system of FIG. 3, note that the improved hybrid transmission of the embodiment is constructed such that the center of gravity G of the lever on the alignment chart shown in FIG. 4 is laid out on the output element Out (common pinion carrier C) to ensure various merits discussed later. The detailed construction of the hybrid transmission of the embodiment, needed to achieve the layout of the lever center-of-gravity G on the output element Out (common pinion carrier C), is hereinafter described in reference to the alignment chart shown in FIG. 6 somewhat similar to FIG. 4. As seen in FIG. 6, on the assumption that a ratio |ENG(Rd)−MG1(Ss)|/|ENG(Rd)−Out(C)| of a distance |ENG(Rd)−MG1(Ss)| between ring gear Rd (engine ENG) and sun gear Ss (first motor-generator MG1) to a distance |ENG(Rd)−Out(C)|=1 between ring gear Rd (engine ENG) and common pinion carrier C (output element Out) is denoted by a lever ratio α, a ratio |Out(C)−MG2(Sd)|/|ENG(Rd)−Out(C)| of a distance |Out(C)−MG2(Sd)| between common planet carrier C (output element Out) and sun gear Sd (second motor-generator MG2) to a distance |ENG(Rd)−Out(C)|=1 between ring gear Rd (engine ENG) and common pinion carrier C (output element Out) is denoted by a lever ratio β, an inertia of a rotating system relating to engine ENG is denoted by Je, an inertia of a rotating system relating to output element Out is denoted by Jo, an inertia of a rotating system relating to the engine side motor-generator (first motor-generator MG1) is denoted by Jmg1, and an inertia of a rotating system relating to the output-element side motor-generator (second motor-generator MG2) is denoted by Jmg2, a distance Xc measured from sun gear Ss (first motor-generator MG1) in a right direction (towards second motor-generator MG2) in the alignment chart of FIG. 6 is represented by the following expression.

$$Xc = \{\alpha \cdot Je + (\alpha+1)Jo + (\alpha+1+\beta) \cdot Jmg2\}/\{Jmg1 + Je + Jo + Jmg2\}$$

To achieve the layout of the lever center-of-gravity G on the output element Out (common pinion carrier C), as shown in FIG. 4, the lever ratio α, lever ratio β, and inertias Je, Jo, Jmg1 and Jmg2 must be determined to satisfy a predetermined equality Xc=(1+α), and the center of gravity G of the lever on the alignment chart of FIG. 4 is laid out at a point that is spaced apart from sun gear Ss (first motor-generator MG1) by the distance Xc (=1+α).

The state of the lever on the alignment chart indicated by the solid line in FIG. 4 corresponds to a motor propelled vehicle driving mode (or a so-called EV mode) by means of only the first and second motor-generators MG1 and MG2 both in operative with engine ENG in inoperative. During the motor propelled vehicle driving mode, second motor-generator MG2 functions as the electric motor that operates at first motor-generator operating point (N2, T2). On the other hand, first motor-generator MG1 functions as the generator that generates electricity while reducing engine speed Ne toward "0". In order to start up the engine from the motor propelled vehicle driving mode, it is necessary to increase engine speed Ne by way of a transition from the state of the lever on the alignment chart indicated by the solid line in FIG. 4 to the state of the lever on the alignment chart indicated by the broken line in FIG. 4. That is, first motor-generator MG1 operates in a regenerative running mode so that the rotational speed of first motor-generator MG1 rotating in a sense opposite to the rotation direction of engine ENG falls down to "0" and whereby the amount of electric power generation of first motor-generator MG1 increases. This results in a rise in engine speed Ne for engine start-up. During the engine start-up period, in order to prevent the deteriorated exhaust emission performance spark-plug firing must be generally initiated with the engine speed Ne risen in advance. Thus, it is desirable to lower engine load during the spark plug firing.

As discussed previously, in the hybrid transmission defined by the alignment chart of FIG. 4, the center of gravity G of the lever on the alignment chart is laid out on the output element Out (common pinion carrier C). Thus, when starting up the engine from the motor propelled vehicle driving mode (EV mode), the lever on the alignment chart indicated by the solid line in FIG. 4 is merely rotated about the lever center-of-gravity G on the output element Out and shifted to the lever on the alignment chart indicated by the broken line in FIG. 4. In case of the previously-noted lever center-of-gravity G layout, there is no change in the driving force of output element Out, and also there is no speed-change of output element Out. Therefore, even when starting up the engine from the motor propelled vehicle driving mode (EV mode), the rotational speed of output element Out cannot be affected by a reaction force arising from the engine inertia. By way of the improved lever center-of-gravity G layout, even during the engine start-up period from the EV mode, it is possible to avoid a temporary drop in vehicle speed, which may occur owing to the great inertia of the engine. Additionally, the improved lever center-of-gravity G layout eliminates the necessity of torque-increase control (or driving-force-increase control) for second motor-generator MG2, which has been executed in the conventional HEV controller for avoiding a temporary vehicle-speed drop. This eliminates the necessity of a large capacity of car battery. During the EV mode, it is possible to propel the vehicle at a threshold limit value of the possible battery output power, thus enhancing the motor propelled vehicle driving performance. In addition to the above, the improved lever center-of-gravity G layout prevents positive and negative torque fluctuations occurring during the engine start-up period from being transmitted to output element Out, thereby avoiding the vehicle's driveability from being deteriorated due to torque fluctuations. Also, it is unnecessary to reduce or cancel such torque fluctuations by way of instantaneous torque control for second motor-generator MG2.

Instead of using the lever center-of-gravity G layout shown in FIG. 4 in which the lever ratio $\alpha$, lever ratio $\beta$, and inertias Je, Jo, Jmg1 and Jmg2 are determined to satisfy a predetermined equality $Xc=(1+\alpha)$, another lever center-of-gravity G layout shown in FIG. 5 in which the lever ratio $\alpha$, lever ratio $\beta$, and inertias Je, Jo, Jmg1 and Jmg2 are determined to satisfy a predetermined inequality $Xc>(1+\alpha)$, may be used. As can be seen from the alignment chart shown in FIG. 5, the hybrid transmission is constructed so that the center of gravity G of the lever on the alignment chart is laid out between the output element Out and the output-element side motor-generator (second motor-generator MG2). In FIG. 5, the state of the lever on the alignment chart indicated by the solid line in FIG. 5 corresponds to the motor propelled vehicle driving mode (EV mode). In order to start up the engine from the motor propelled vehicle driving mode (EV mode), it is necessary to increase engine speed Ne by way of a transition from the state of the lever on the alignment chart indicated by the solid line in FIG. 5 to the state of the lever on the alignment chart indicated by the broken line in FIG. 5 by virtue of power generating operation of first motor-generator MG1 in the same manner as the hybrid transmission defined by the alignment chart of FIG. 4. In the hybrid transmission defined by the alignment chart of FIG. 5, the center of gravity G of the lever on the alignment chart is laid out between the output element Out and the output-element side motor-generator (second motor-generator MG2). Thus, when starting up the engine from the motor propelled vehicle driving mode (EV mode), the lever on the alignment chart indicated by the solid line in FIG. 5 is rotated about the lever center-of-gravity G between the output element Out and the output-element side motor-generator (second motor-generator MG2) and shifted to the lever on the alignment chart indicated by the broken line in FIG. 5. Such a transition from the lever on the alignment chart indicated by the solid line in FIG. 5 to the lever on the alignment chart indicated by the broken line in FIG. 5 changes transmission output speed No (the rotational speed of output element Out) but a direction of the transmission-output-speed change corresponds to a speed-increase direction. In this case, to compensate for the transmission-speed change (that is, the transmission-speed increase), torque produced by the output-element side motor-generator (second motor-generator MG2) must be controlled or adjusted in a torque-reduction direction. The second motor-generator torque-reduction control means power generating operation of second motor-generator MG2. Therefore, during the motor propelled vehicle driving mode (EV mode), it is possible to effectively propel the vehicle at a threshold limit value of the possible battery output power, thus enhancing the electric vehicle (EV) driving performance (the motor propelled vehicle driving performance). In the same manner as the hybrid transmission ($Xc=1+\alpha$) defined by the alignment chart of FIG. 4, the hybrid transmission ($Xc>1+\alpha$) defined by the alignment chart of FIG. 5 eliminates the necessity of a large capacity of car battery.

That is, from a combination of constructions of the hybrid transmissions shown in FIGS. 4 and 5, to achieve the layout of the lever center-of-gravity G as shown in FIGS. 4 and 5, the lever ratio $\alpha$, lever ratio $\beta$, and inertias Je, Jo, Jmg1 and Jmg2 are determined to satisfy a predetermined equality $Xc \geq (1+\alpha)$, and the center of gravity G of the lever on each of alignment charts of FIGS. 4 and 5 is laid out at a point that is spaced apart from sun gear Ss (first motor-generator MG1) by the distance Xc ($\geq 1+\alpha$). Thus, it is possible to easily design the position of the lever center-of-gravity G.

Figure 7:
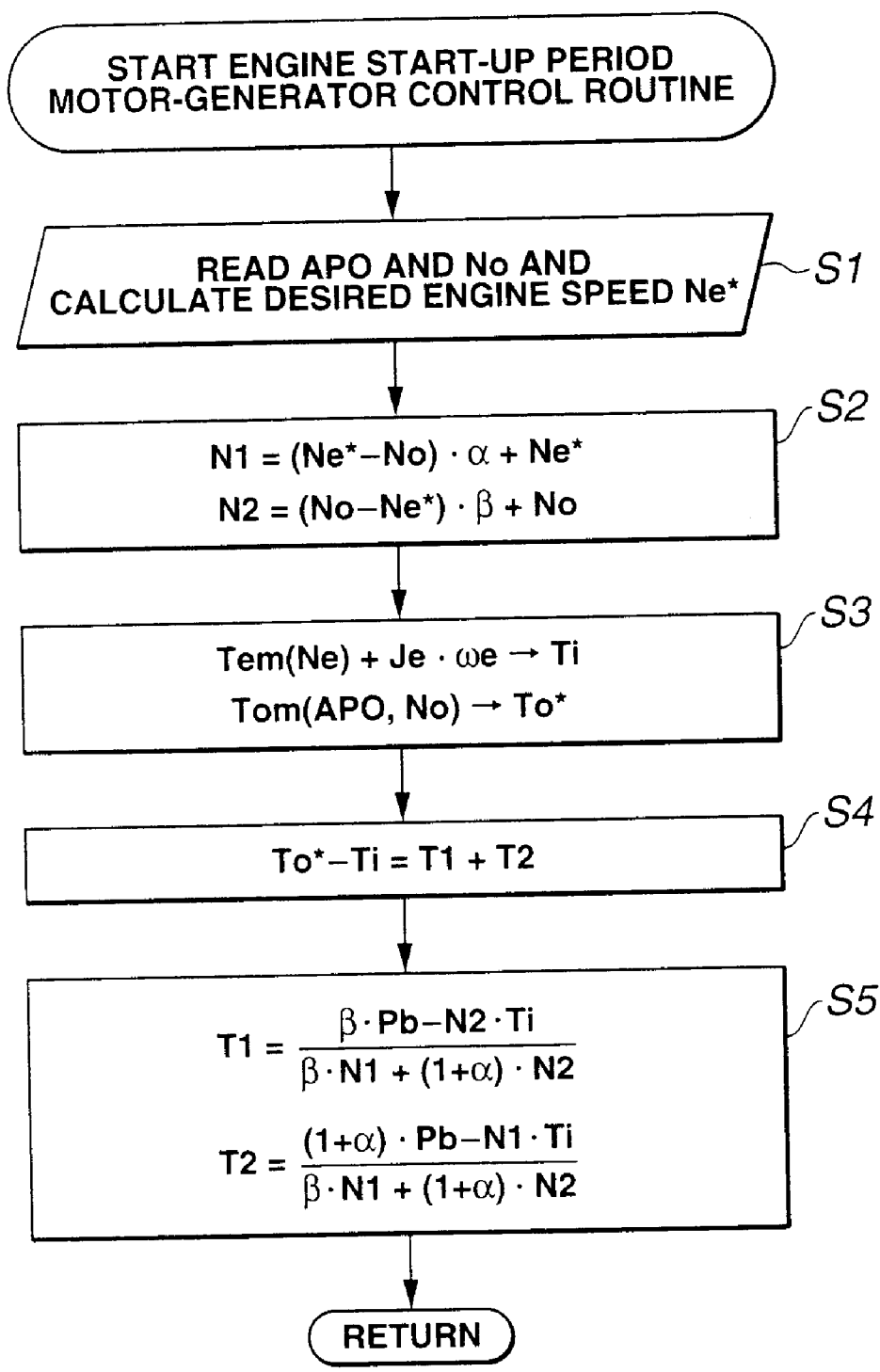
FIG. 7 is a flow chart illustrating an engine start-up period motor-generator control program executed within a hybrid controller of the automatic shift control system shown in FIG. 3, when starting up the engine from a motor propelled vehicle driving mode.

Referring now to FIG. 7, there is shown the engine start-up period motor-generator control routine that is executed by the processor of hybrid controller 10 shown in FIG. 3 to determine first motor-generator operating point (N1, T1) and second motor-generator operating point (N2, T2) when starting up the engine from the motor propelled vehicle driving mode (EV mode) by increasing engine speed Ne from "0". The engine start-up period motor-generator control routine shown in FIG. 7 is executed as time-triggered interrupt routines to be triggered every predetermined intervals such as 10 msec.

At step S1, accelerator opening APO and transmission output speed No are read, and additionally a desired engine speed Ne* is computed or map-retrieved based on both the accelerator opening APO and transmission output speed No from a preprogrammed APO-No-Ne* characteristic map showing how desired engine speed Ne* has to be varied relative to both the accelerator opening APO and transmission output speed No.

At step S2, first motor-generator rotational speed N1 of first motor-generator MG1 is arithmetically calculated based on desired engine speed Ne*, transmission output speed No and lever ratio $\alpha$, from the expression $N1=(Ne*-No)\cdot\alpha+Ne*$, and additionally second motor-generator rotational speed N2 of second motor-generator MG2 is arithmetically calculated based on desired engine speed Ne*, transmission output speed No and lever ratio $\beta$, from the expression $N2=(No-Ne*)\cdot\beta+No$.

At step S3, a load Ti placed on the engine when starting up the engine and a desired torque To* of the hybrid vehicle are arithmetically calculated. More concretely, during the first few moments of the engine start-up, actually the engine has not been started, and thus the engine start-up period load Ti is represented as the sum of an engine-speed dependent friction torque Tem(Ne) and an engine inertia torque Je·ωe (where Je denotes the inertia of the rotating system relating to engine ENG and ωe denotes an axial acceleration). That is, Ti=Tem(Ne)+Je·ωe. On the other hand, desired torque To* of the hybrid vehicle is computed or map-retrieved based on accelerator opening APO and transmission output speed No from a preprogrammed APO-No-To* torque map Tom(APO, No) showing how desired torque To* has to be varied relative to both the accelerator opening APO and transmission output speed No. As a matter of course, the preprogrammed APO-No-To* torque map Tom(APO, No) is a predetermined characteristic map that the maximum torque value of desired torque To* is limited within a torque value corresponding to the possible battery output power Pb.

At step S4, the sum (T1+T2) of first and second motor-generator torques T1 and T2 is arithmetically calculated as the difference (To*−Ti) between desired torque To* of the hybrid vehicle and engine start-up period load Ti. That is, To*−Ti=T1+T2.

At step S5, the total motor-generator torque (T1+T2=To*−Ti) is distributed or allotted into first and second motor-generator torques T1 and T2, as follows.

$$T1=(\beta \cdot Pb - N2 \cdot Ti)/\{\beta \cdot N1 + (1+\alpha) \cdot N2\}$$

$$T2=\{(1+\alpha)Pb - N1 \cdot Ti\}/\{\beta \cdot N1 + (1+\alpha) \cdot N2\}$$

Where α is the lever ratio of distance |ENG(Rd)−MG1(Ss)| between ring gear Rd (engine ENG) and sun gear Ss (first motor-generator MG1) to distance |ENG(Rd)−Out(C)| between ring gear Rd (engine ENG), β is the lever ratio of distance |Out(C)−MG2(Sd)| between common planet carrier C (output element Out) and sun gear Sd (second motor-generator MG2) to distance |ENG(Rd)−Out(C)| between ring gear Rd (engine ENG) and common pinion carrier C (output element Out), Pb is the possible battery output power, N1 is the first motor-generator speed, N2 is the second motor-generator speed, and Ti is the load on engine ENG.

In the above-mentioned two expressions, an inertia torque occurring due to inertia of each of first and second motor-generators MG1 and MG2 is omitted. This is because the inertia torque occurring due to inertia of each of first and second motor-generators MG1 and MG2 is negligibly less than that of engine ENG. However, for the purpose of more precisely calculating the two allotted torques, namely first and second motor-generator torques T1 and T2, the inertia torque occurring due to inertia of each of first and second motor-generators MG1 and MG2 may be taken into account.

Figure 8:
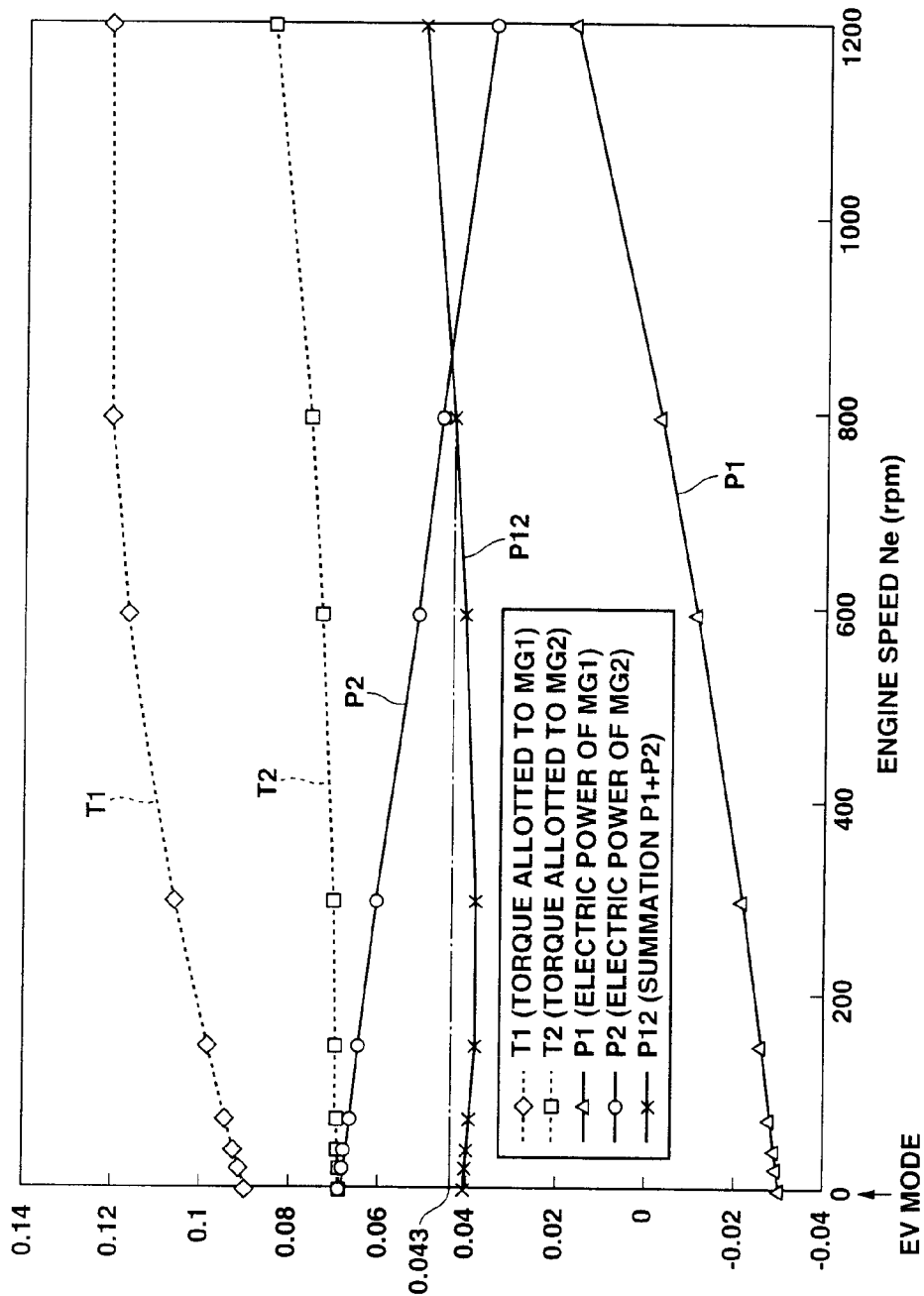
FIG. 8 is a graph explaining the control action of the engine start-up period motor-generator control of FIG. 7.
Figure 9:
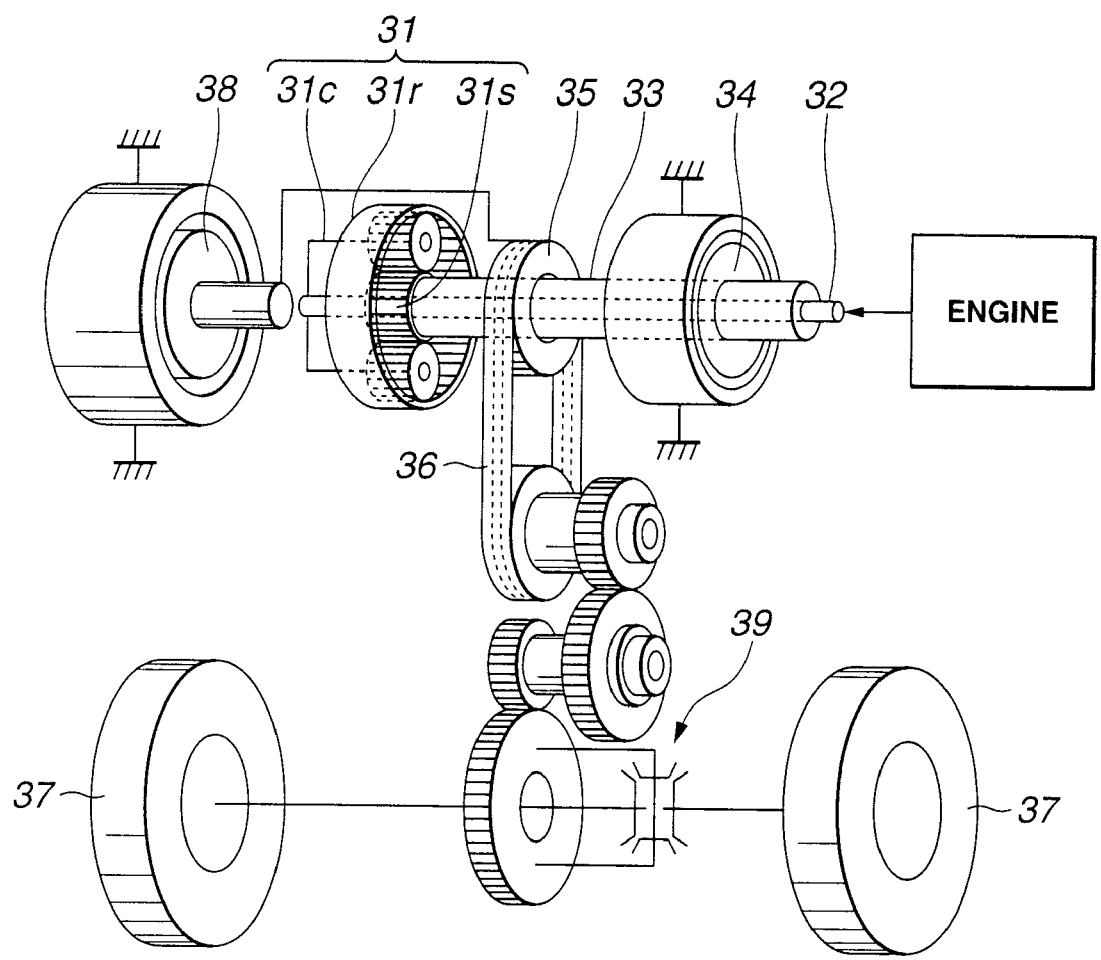
FIG. 9 is a schematic structural drawing of the conventional hybrid automatic transmission.
Figure 10:
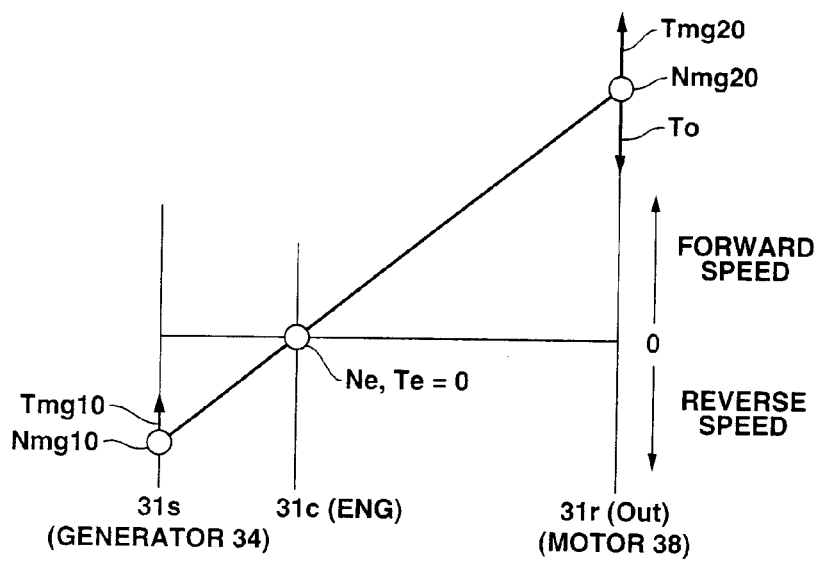
FIG. 10 is an alignment chart of the hybrid automatic transmission shown in FIG. 9 in a motor propelled vehicle driving mode.
Figure 11:
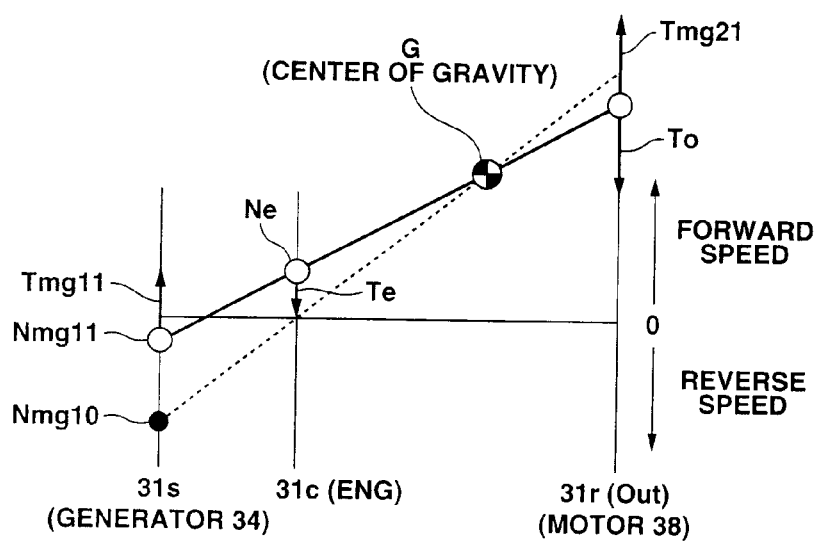
FIG. 11 is an alignment chart of the hybrid automatic transmission shown in FIG. 9 when starting up the engine from the motor propelled vehicle driving mode.

The first motor-generator operating point (N1, T1) and the second motor-generator operating point (N2, T2), both computed or arithmetically calculated through the engine start-up period motor-generator control routine of FIG. 7, are output to motor-generator controller 12 for first motor-generator MG1 control and for second motor-generator MG2 control. As a consequence, it is possible to smoothly start up the engine, while keeping both the desired engine speed Ne* and transmission output speed No. According to the aforementioned engine start-up period motor-generator control shown in FIG. 7, as can be seen from characteristic curves shown in FIG. 8, first motor-generator torque T1 allotted to first motor-generator MG1, second motor-generator torque T2 allotted to second motor-generator MG2, electric power P1 of first motor-generator MG1, electric power P2 of second motor-generator MG2, and the sum P12 (=P1+P2) of the two electric powers P1 and P2 vary, as engine speed Ne increases. In FIG. 8, first motor-generator torque value T1 is a normalized first motor-generator torque value on the assumption that the maximum engine torque of engine ENG is "1". Second motor-generator torque value T2 is a normalized second motor-generator torque value on the assumption that the maximum engine torque of engine ENG is "1". Likewise, the electric power P1, electric power P2 and the summation P12 are normalized values on the assumption that the maximum engine torque of engine ENG is "1". In FIG. 8, the negative value of electric power P1 means the generated electric power, whereas the positive value of electric power P1 means the consumed electric power. In the graph shown in FIG. 8, the zero engine speed (Ne=0) means the motor propelled vehicle driving mode (EV mode) during which there is no engine power output. During the motor propelled vehicle driving mode (EV mode) under the condition of Ne=0, the summation P12 (=P1+P2) of first and second motor-generator electric powers P1 and P2 is approximately 0.04. In order to start up the engine from the motor propelled vehicle driving mode (Ne=0), engine speed Ne of engine ENG that functions as a load resistance must be risen with power generating operation of first motor-generator MG1 that operates in the regenerative running mode so that the first motor-generator speed falls down to "0". At this time, as can be appreciated from the characteristic curve of the summation P12 (=P1+P2), the summation P12 tends to decrease until engine speed Ne reaches 600 rpm. When engine speed Ne further increases from 600 rpm, the summation P12 begins to increase. This means that a greater electric power at engine speeds of 600 rpm or more is required as compared to an electric power needed under the zero engine speed condition (Ne=0). Suppose that engine speed Ne must be increased up to a revolution speed of 800 rpm during the engine start-up period from the motor propelled vehicle driving mode (EV mode). The summation P12 (=P1+P2) at Ne=800 rpm is approximately 0.043. At this time, the ratio (=0.043/0.04) of the summation P12 (=0.043) at engine speed Ne=800 rpm to the summation P12 (=0.04) at engine speed Ne=0 is almost equal to 7.5%. Thus, it is possible to achieve an engine speed rise to 800 rpm by way of satisfactory motoring of second motor-generator MG2 by reserving a slight electric power corresponding to the ratio of 7.5%, and thereafter to reliably start up the engine by spark-plug firing. That is, the hybrid transmission construction of the embodiment eliminates the necessity of a large capacity of car battery. In other words, it is possible to use a comparatively small capacity of car battery capable of generating electric power required for the normal EV mode.

In addition to the above, according to the hybrid transmission of the embodiment, as previously discussed in reference to the alignment charts shown in FIGS. 4 and 5, ring gear Rd (engine ENG) and common pinion carrier C (output element Out) are laid out between sun gear Ss (first motor-generator MG1) and sun gear Sd (second motor-generator MG2). The output-element side motor-generator (second motor-generator MG2) is operated or driven as a motor, whereas the engine side motor-generator (first motor-generator MG1) is operated or driven as a generator. The motor propelled vehicle driving mode (EV mode) is performed such that engine speed Ne is kept below an idle speed such as 600 rpm by determining and controlling the motor-generator operating state of each of first and second motor-generators MG1 and MG2, that is, first and second motor-generator operating points (N1, T1) and (N2, T2). The amount of electric power generation of first motor-generator MG1 can be used to drive second motor-generator MG2 (the output-element side motor). As a result, it is possible to achieve the EV mode by a comparatively small electric power to be supplied by the battery. Additionally, it is possible to minimize the load loss by keeping the state of Ne=0 during the EV mode.

Furthermore, in the hybrid transmission of the embodiment, the engine is started up from the EV mode by virtue of the increased amount of electric power generation of first motor-generator MG1. Therefore, it is possible to effectively reduce the electric energy to be supplied from the battery. This contributes to a reduced capacity of the car battery.

Moreover, when starting up the engine from the EV mode, actually the engine can be started for a period of time during which the rotational speed of first motor-generator MG1 rotating in a sense opposite to the rotation direction of engine ENG falls. That is, during the EV mode, first motor-generator MG1 rotates in the direction opposite to the rotation direction of engine ENG. In presence of a transition from EV mode to engine start-up state, the engine can be started up while generating electricity by falling the rotational speed of first motor-generator MG1 rotating in the opposite rotation direction. In other words, when starting up the engine from the EV mode, it is possible to effectively reduce the electric power consumption of the battery. If first motor-generator MG1 is constructed in such a manner as to rotate in the same rotational direction as engine ENG during the EV mode, first motor-generator MG1 (the engine side motor-generator) as well as second motor-generator MG2 (the output-element side motor-generator) functions as a motor, and therefore the electric power consumption tends to increase. As can be appreciated, the construction of first motor-generator MG1 having the different rotation direction from the rotation direction of engine ENG is superior in reduced electric power consumption.

In the hybrid transmission of the embodiment shown in FIG. 1, a compound multiphase AC, multi-layer motor 3, which has multiple rotors (two rotors in the shown embodiment) and is driven by compound multiphase AC, is used as the motor-generator set (MG1, MG2). Such compound multiphase AC, multi-layer motor 3 is superior in reduced motor loss, increased power-transmission efficiency during torque recirculation, and enhanced fuel economy. In contrast to the above, in the modified hybrid transmission shown in FIG. 2, first and second motor-generators MG1 and MG2 may be laid out in such a manner as to be radially offset from each other. The radial offset layout of motor-generators MG1 and MG2 is superior in increased degrees of freedom of the motor-generator layout in a limited space of the transmission case.

The entire contents of Japanese Patent Application No. P2002-083090 (filed Mar. 25, 2002) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hybrid automatic transmission of a hybrid electric vehicle mounting thereon a prime mover, first and second motor-generators and a drive train, and capable of steplessly varying a transmission gear ratio by controlling an operating state of each of the first and second motor-generators, comprising:

a differential device having at least four rotating members and two degrees of freedom that determining rotating states of two members of the four rotating members enables rotating states of the other rotating members to be determined, a first member of the four rotating members serving as an input element connected to the prime mover, a second member serving as an output element connected to the drive train, a third member connected to the first motor-generator, and a fourth member connected to the second motor-generator; and a specified relationship among an inertia of a rotating system relating to the prime mover, an inertia of a rotating system relating to the output element, an inertia of a rotating system relating to the first motor-generator, an inertia of a rotating system relating to the second motor-generator, a first lever ratio of a distance between the input element and the first motor-generator to a distance between the input and output elements, and a second lever ratio of a distance between the output element and the second motor-generator to the distance between the input and output elements is determined so that a center of gravity of a lever on an alignment chart of the hybrid automatic transmission is laid out on the output element or between the output element and the second motor-generator.

2. The hybrid automatic transmission as claimed in claim 1, wherein:

assuming that a ratio of the distance between the input element and the first motor-generator to the distance between the input and output elements is denoted by the lever ratio $\alpha$, a ratio of the distance between the output element and the second motor-generator to the distance between the input and output elements is denoted by the lever ratio $\beta$, the inertia of the rotating system relating to the prime mover is denoted by Je, the inertia of the rotating system relating to the output element is denoted by Jo, the inertia of the rotating system relating to the first motor-generator is denoted by Jmg1, and the inertia of the rotating system relating to the second motor-generator is denoted by Jmg2, a distance Xc measured from the first motor-generator towards the second motor-generator in the alignment chart is represented by an expression $$Xc=\{\alpha \cdot Je+(\alpha+1)Jo+(\alpha+1+\beta) \cdot Jmg2\}/\{Jmg1+Je+Jo+Jmg2\}, \text{ and}$$

the lever ratios $\alpha$ and $\beta$, and the inertias Je, Jo, Jmg1, and Jmg2 are determined to satisfy a predetermined inequality $Xc \geq (1+\alpha)$, and the center of gravity of the lever on the alignment chart is laid out at a point that is spaced apart from the first motor-generator by the distance Xc.

3. The hybrid automatic transmission as claimed in claim 1, wherein:

the first and second motor-generators comprise a compound multiphase alternating current, multi-layer motor, which has inner and outer rotors and a common stator disposed between the inner and outer rotors, and is driven by compound multiphase alternating current;

the first motor-generator comprises the common stator and the outer rotor;

the second motor-generator comprises the common stator and the inner rotor; and the outer rotor of the first motor-generator and the inner rotor of the second motor-generator are driven independently of each other by applying the compound multiphase alternating current to the common stator, the compound multiphase alternating current being obtained by compounding a control current applied to the first motor-generator and a control current applied to the second motor-generator.

4. The hybrid automatic transmission as claimed in claim 1, wherein:

the differential device comprises a Ravigneaux type planetary gearset that a single-pinion type planetary gearset is combined with a double-pinion type planetary gearset, the single-pinion type planetary gearset comprising a sun gear, a common ring gear, and a common pinion in meshed-engagement with both the sun gear and the common ring gear, and the double-pinion planetary gearset comprising a sun gear, the common pinion, the common ring gear, a ring gear, and a large-diameter pinion in meshed-engagement with all of the sun gear, the ring gear, and the common pinion.

5. The hybrid automatic transmission as claimed in claim 1, wherein:

the input and output elements are laid out between the first and second motor-generators on the alignment chart of the hybrid automatic transmission;

the second motor-generator located on a side of the output element is operated as a motor and the first motor-generator located on a side of the input element is operated as a generator, and the operating state of each of the first and second motor-generators is determined so that a rotational speed of the prime mover is kept below a predetermined idle speed to enable a motor propelled vehicle driving mode in which the hybrid electric vehicle is propelled by only the second motor-generator operating as the motor.

6. The hybrid automatic transmission as claimed in claim 5, wherein:

the motor propelled vehicle driving mode is performed at a threshold limit value of a possible battery output power.

7. The hybrid automatic transmission as claimed in claim 1, wherein:

the prime mover is started up from the motor propelled vehicle driving mode by increasing an amount of electric power generation of the first motor-generator.

8. The hybrid automatic transmission as claimed in claim 7, wherein:

the prime mover is started up for a period of time during which a rotational speed of the first motor-generator rotating in a sense opposite to a rotation direction of the prime mover falls.

\* \* \* \* \*

UNITED STATES PATENT AND TRADEMARK OFFICE
CERTIFICATE OF CORRECTION

PATENT NO. : 6,732,526 B2
DATED : May 11, 2004
INVENTOR(S) : Yuusuke Minagawa et al.

It is certified that error appears in the above-identified patent and that said Letters Patent is hereby corrected as shown below:

Title page,
Item [75], Inventors, please add the following inventors:
-- Keyvan Kargar, Versailles, France
   Yves Pichon, Boulogne-Billancourt, France --.

Item [73], Assignee, please add the following Assignee:
-- RENAULT s.a.s. société par actions simplifée, Boulogne-Billancourt, France --.

Signed and Sealed this

Twentieth Day of September, 2005

JON W. DUDAS
*Director of the United States Patent and Trademark Office*